(12) United States Patent
Phipps et al.

(10) Patent No.: US 10,611,473 B2
(45) Date of Patent: Apr. 7, 2020

(54) POWER AND DATA TETHER FOR AUTONOMOUS SYSTEMS

(71) Applicant: The United States of America as represented by the Secretary of the Navy, San Diego, CA (US)

(72) Inventors: Alex G. Phipps, San Diego, CA (US); Everly Yeo, San Diego, CA (US); Victor Saucedo, San Diego, CA (US); Frank Alonge, San Diego, CA (US); Sam Chieh, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 278 days.

(21) Appl. No.: 15/708,624

(22) Filed: Sep. 19, 2017

(65) Prior Publication Data

US 2018/0170538 A1 Jun. 21, 2018

Related U.S. Application Data

(60) Provisional application No. 62/435,959, filed on Dec. 19, 2016.

(51) Int. Cl.
*B64C 39/02* (2006.01)
*H04B 7/185* (2006.01)
*H02J 7/00* (2006.01)

(52) U.S. Cl.
CPC .......... *B64C 39/022* (2013.01); *B64C 39/024* (2013.01); *H04B 7/18506* (2013.01); *B64C 2201/066* (2013.01); *B64C 2201/141* (2013.01); *B64C 2201/148* (2013.01); *H02J 7/00* (2013.01)

(58) Field of Classification Search
CPC ......... B64C 27/00; B64C 27/02; B64C 27/04; B64C 27/20; B64C 29/00; B64C 39/00; B64C 39/02; B64C 2201/00; B64C 2201/04; B64C 2201/042
See application file for complete search history.

(56) References Cited

U.S. PATENT DOCUMENTS 7,631,834 B1 * 12/2009 Johnson ................ B64C 39/024
244/17.11

* cited by examiner

*Primary Examiner* — Robert J McCarry, Jr.
(74) *Attorney, Agent, or Firm* — Naval Information Warfare Center, Pacific; Kyle Eppele; Susanna Torke

(57) ABSTRACT

A system comprising a tether having two conductors, wherein one end is electrically coupled to a ground system and the other end is electrically coupled to an aerial system; the ground system comprising a power signal and a data signal, wherein the power signal and data signal are interfaced through a bias-tee circuit, the ground system further comprising a transient attenuation circuit; the aerial system comprising a bias-tee circuit and a transient attenuation circuit; the ground system configured to send and the aerial system configured to receive the power signal via the tether, and the ground system and the aerial system configured to send and receive the data signal via the tether.

15 Claims, 2 Drawing Sheets

POWER AND DATA TETHER FOR AUTONOMOUS SYSTEMS

FEDERALLY-SPONSORED RESEARCH AND DEVELOPMENT

Power and Data Tether for Autonomous Systems is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 104136.

BACKGROUND

Unmanned aerial vehicles (UAVs) are attractive platforms for a wide variety of applications, and by leveraging commercially available systems, users can minimize both cost and development time. One challenge with these systems is that they are battery-operated and have relatively short mission lifetimes.

Commercial tethered solutions have been developed that transfer power up a wire to the UAV. However, these solutions have several issues. One issue is the trade-off between the power required by the UAV and the tether size or weight. For UAVs that require high power for flight or for their payload, heavy wire must be used, and the weight of the tether becomes a limiting factor. Another issue arises with control of the UAV and its payload. Radio frequency (RF) communication methods can be used to control the UAV, but RF is vulnerable to detection, natural interference, and intentional jamming. Current commercial quad copters can only operate for 30-60 minutes before needing to be re-charged, while a tether can provide power for hours or days. Extra wires can be added to the tether for secure communications, but these add additional weight and complexity to the airborne system.

Using a tether that carries both the power and the communication signals from the ground station to the UAV will allow for continuous operation and secure data stream. The method and system described below provide continuous operation and a secure data stream. Additionally, by combining the power and data along a single wire, the weight of the tether can be greatly reduced.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The system described herein provides a tether for delivering power and data to an unmanned vehicle. Currently, power for these types of vehicles is provided by batteries, and data is delivered by radio frequency (RF), acoustic, or some other means. While a tether can potentially limit the mobility of these unmanned vehicle platforms, it greatly increases the amount of time that it can operate.

Additionally, should the tether break or stop working, the system described herein has a battery bank that switches over and provides power to the system. The communication line switches from wired to wireless so that a pilot or user can bring it down safely. The power and data tether system has special circuits on the ground side and on the air side that separate the power and data. The embodiments described herein include additional circuitry to ensure that the power system does not damage the data system when the power system is first turned on (due to high voltage or current transient surges), and to ensure that data does not make the power signal noisy.

Figure 1:
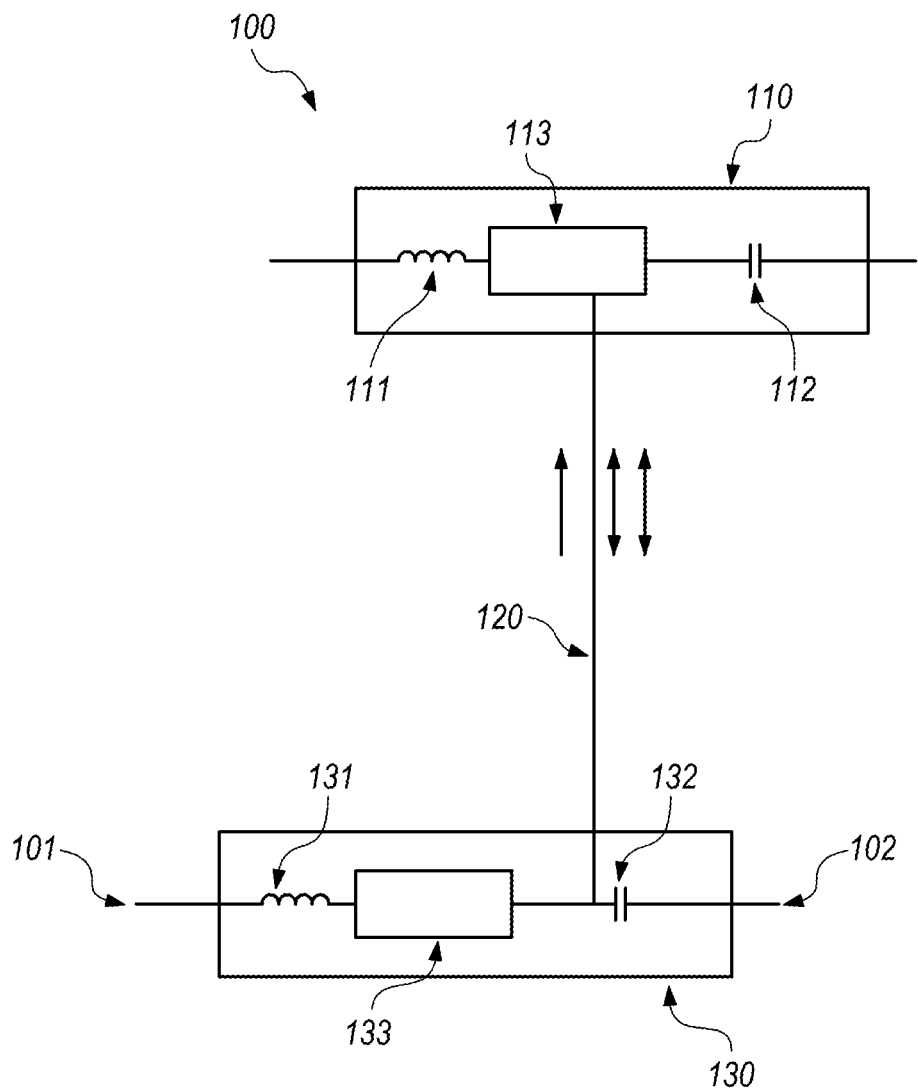
FIG. 1 shows a schematic view of the Power and Data Tether System.

FIG. 1 shows a schematic diagram of the power and data tether system 100. System 100 is powered by a DC power signal 101 and transfers data using a RF signal 102. System 100 has an aerial system 110, a tether 120, and a ground system 130. An example of an embodiment for aerial system 110 can be any type of Unmanned Aerial Vehicle (UAV). Aerial system 110 can have a bias tee circuit with an inductor 111 and a capacitor 112. The bias-tee circuit provides some isolation between the high power path and the data path, because DC power signal 101 is separated from RF signal 102. Upon separation, they are routed to the proper components within aerial system 110. This isolation helps protect the data line from high voltage pulses generated by power and data tether system 100. Aerial system 110 can also have a transient attenuation circuit 113 to prevent high voltage and high current transient surges from damaging the lower-power aerial data circuitry. This may or may not be needed since losses in a tether will dampen the surges generated by the high power signal on start-up.

Tether 120 is a coaxial cable having two conductors (not shown) required to maintain integrity of DC power signal 101 and RF signal 102.

Ground system 130 allows DC power signal 101 and RF signal 102 to interface through a bias-tee circuit similar to that in aerial system 110. The bias tee circuit is a component that puts both DC power signal 101 and RF signal 102 on tether 120, and it includes an inductor 131 that blocks RF signal 102, and a capacitor 132 that blocks DC power signal 101.

In order for a tether to be implemented with a thin and lightweight wire, power is transmitted at a high voltage (just like on power lines). One embodiment of the system can use a 400V DC input to accommodate the 1600 watts required by the UAV, but other values could also be used. The RF equipment operates at lower voltages (3-5) volts and must be protected from the high voltage of the power signal. While capacitor 132 blocks DC power signal 101 during steady-state operation, when system 100 is first turned on it is possible for high voltage surges to leak through. Similar to in aerial system 110, a transient attenuation circuit 133 prevents DC power signal 101 from damaging the more sensitive RF equipment during start-up.

Figure 2:
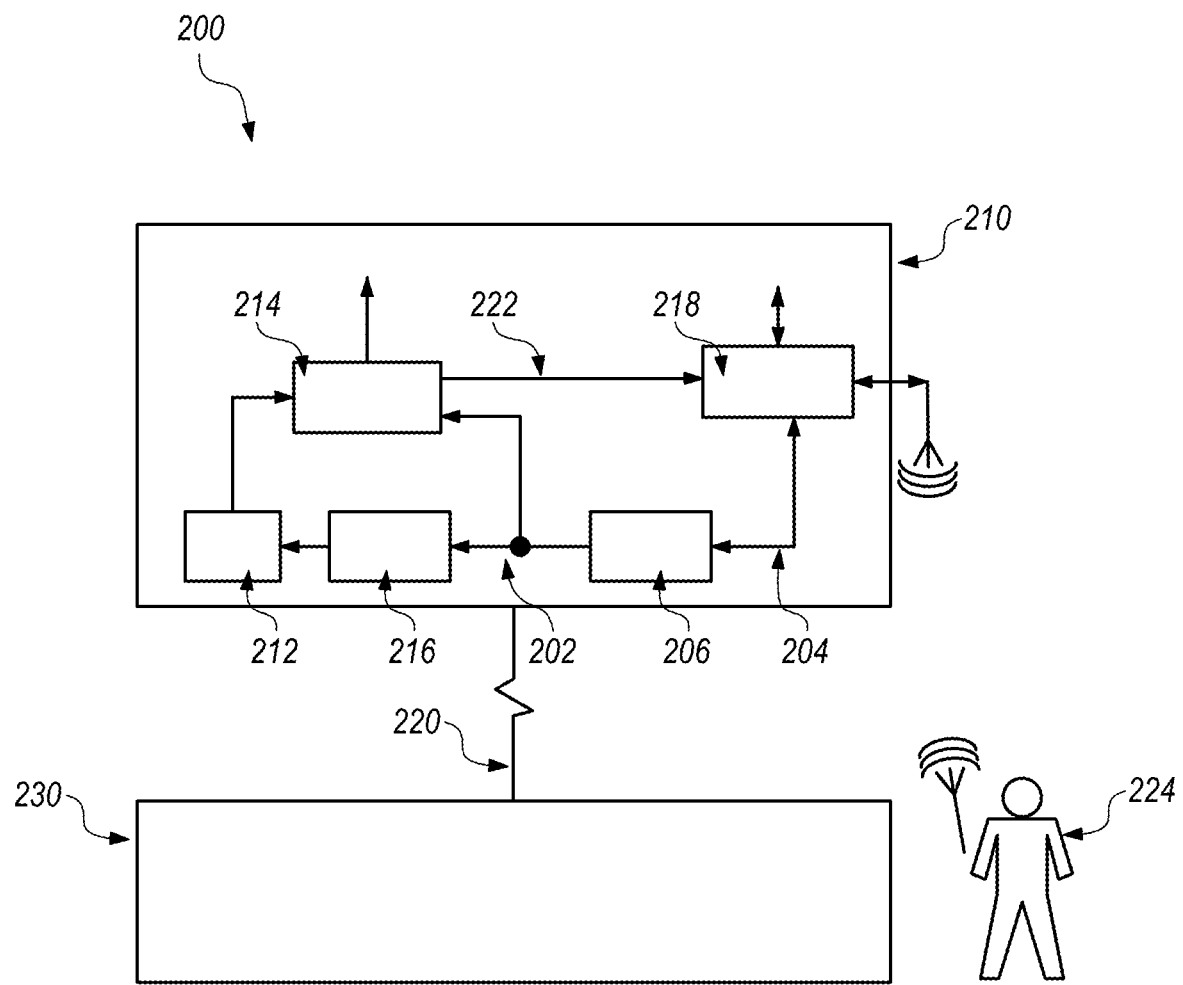
FIG. 2 shows a graph depicting the safety systems in accordance with the Power and Data Tether for Autonomous Systems.

To protect the UAV and its payload from a tether failure (such as loss of power at the ground station, a break in the tether, etc.) several safety mechanisms are built into system 100. FIG. 2 shows a diagram 200 of these various safety mechanisms. FIG. 2 shows an aerial system 210, a damaged tether 220, and a ground system 230. Similar to FIG. 1, FIG. 2 shows a DC power signal 202 and a data signal 204 being separated by a bias-tee circuit 206 within aerial system 210. Aerial system 210 requires DC power signal 202 and data signal 204 to operate. However in FIG. 2, damaged tether 220 is preventing the delivery of DC power signal 202 and data signal 204. Thus, a small battery 212 is included in aerial system 210 with enough power to allow aerial system 210 to land safely. A power path control circuit 214 is included to determine whether tether 220 has available power. If not, aerial system 210 will switch to using backup power from battery 212, similar to a laptop using wall power before it uses the battery. Additionally, a battery charging circuit 216 is included in aerial system 210, which will keep battery 212 charged. Battery charging circuit 216 will generally use a small amount of energy provided by an undamaged tether to keep battery 214 at full charge. This is important for long missions where a battery may self-discharge, or be required for surge conditions such as maneuvers where power requirements exceed tether-delivered power. Finally, when power path control circuit 214 switches from damaged tether 220 to battery 212, system 200 can be configured to revert to control to a user via an RF switch 218, which is controlled by a tether monitor signal 222. In other words, an operator 224 can control how to bring down aerial system 210.

Alternate embodiments of the power and data tether system can include a switch that allows data to be sent either wired or wirelessly. It is the same data, however the transmission method changes. Additionally, the power and data tether system is not limited to use on UAVs. It could also be used for surface and underwater vehicles. Tethers provide a power lifeline for undersea vehicles and would prevent interference with acoustic data usually used for underwater communications.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system comprising:
    a tether comprised of two conductors, wherein the tether has a first end and second end, and wherein the first end is electrically coupled to a ground system and the second end is electrically coupled to an aerial system;
    the ground system comprising a DC power signal and a RF data signal, wherein the DC power signal and RF data signal are interfaced through a bias-tee circuit, the ground system further comprising a transient attenuation circuit;
    the aerial system comprising a bias-tee circuit and a transient attenuation circuit;
    the ground system configured to send and the aerial system configured to receive the DC power signal via the tether, and the ground system and the aerial system configured to send and receive the RF data signal via the tether.

2. The system of claim 1, wherein the aerial system is an unmanned aerial vehicle.

3. The system of claim 2, wherein the tether is a coaxial cable.

4. The system of claim 1, wherein the aerial system further comprises a battery, a battery charger, and a battery charging circuit.

5. The system of claim 4, wherein the aerial system further comprises a power path control circuit.

6. A method comprising the steps of:
    using a tether having a first and second end and a first and second conductor, coupling the first end of the tether to a ground system, the ground system configured to send a DC power signal via the first conductor and send and receive a RF data signal via the second conductor;
    coupling the second end of the tether to an aerial system, the aerial system configured to receive a DC power signal via the first conductor and send and receive a RF data signal via the second conductor;
    using a bias tee circuit in the ground system and aerial system to interface the RF data signal and the DC power signal; and
    using a transient attenuation circuit in both the ground system and aerial system to prevent damage.

7. The method of claim 6, wherein the DC power signal is transmitted at a high voltage.

8. The method of claim 6, wherein upon damage to the tether, the aerial system can be configured to operate using a battery.

9. The method of claim 8, wherein the aerial system can be configured to revert control to a user via a radio frequency (RF) switch as controlled by a tether monitor signal.

10. A method for delivering power and data comprising the steps of:
    using a tether to electrically connect a ground system and an aerial system, wherein the tether has a first and a second conductor;
    transmitting a DC power signal at a high voltage via the first conductor and a RF data signal via the second conductor from the ground system to the aerial system, using a bias tee circuit within the ground system to allow the RF data signal and DC power signal to interface;

using a transient attenuation circuit in both the ground system and aerial system to prevent any damage;

using a bias tee circuit in the aerial system to isolate the DC power signal and RF data signal, and routing the DC power signal and RF data signal to the proper components within the aerial system.

11. The method of claim 10, wherein the high voltage used is 400 volts.

12. The method of claim 10, further comprising the steps of:

housing the aerial system with a battery;

using the battery to power the aerial system if the tether becomes damaged.

13. The method of claim 12, wherein a battery charging circuit is used to keep the battery charged.

14. The method of claim 10, wherein the aerial system is replaced with an underwater system.

15. The method of claim 10, wherein the RF data signal is transmitted wirelessly.

\* \* \* \* \*